Patented Apr. 18, 1939

2,154,798

UNITED STATES PATENT OFFICE 2,154,798

FLUID ESTER GUM COMPOSITION

Herbert A. Winkelmann, Chicago, and James P. McKenzie, Evanston, Ill., assignors to Marbon Corporation, Chicago, Ill., a corporation of Delaware No Drawing. Application October 31, 1936, Serial No. 108,681

2 Claims. (Cl. 134—17)

This invention relates to a new composition of matter and relates particularly to compositions containing rubber hydrohalides and fluid ester gums.

An object of this invention is to provide an improved clear adhesive.

Another object is to provide a lacquer particularly adapted for coating on rubber and other flexible surfaces.

A further object is to provide a homogenizing agent for use with rubber hydrochloride compositions during milling.

Another object is to provide improved plasticized rubber hydrochloride compositions.

Other objects will become apparent on reading the specification and appended claims.

We have discovered that the fluid ester gums such as methyl abietate, ethyl abietate, hydrogenated methyl abietate, and hydrogenated ethyl abietate are compatible with rubber hydrochloride in all proportions, dissolve in mutual solvents with rubber hydrochlorides to form clear solutions and act as plasticizers for rubber hydrochlorides. Furthermore, the fluid ester gum may be incorporated in rubber and the mixture reacted with hydrogen chloride to obtain an intimate mixture of rubber hydrochloride and ester gum. Stabilizers and fillers may be incorporated with this mixture by fluxing it on a mill or in any agitator mixer under positive pressure. The ester gum acts as a homogenizer and plasticizer allowing the incorporation of materials in this manner much more readily than if it is not present.

The proportion of fluid ester gum to rubber hydrohalide may be varied widely depending on the characteristics desired and the use for the composition.

In the production of clear, permanently tacky adhesives the fluid ester gum is used in such proportions that the tacky adhesive quality of the fluid ester gum is not overcome by the rubber hydrochloride. In general, the preferred permanently tacky adhesives will contain from about 1 to 3 parts by weight of ester gum per one part by weight of rubber hydrochloride. For hard setting adhesives and for lacquers the fluid ester gum is used in lesser proportions so that the non tacky and high tensile, tough properties of the rubber hydrochloride will predominate. The type of rubber hydrochloride may vary. However, for liquid coating compositions we prefer to use the permanently amorphous or soluble type rubber hydrochloride since the crystalline type rubber hydrochloride will gel in concentrations too low for most commercial purposes. Saturated or partially saturated rubber hydrochlorides may be used but for most purposes, including molded products and lacquers the substantially saturated rubber hydrochlorides are most suitable. For liquid compositions a low viscosity product obtained by milling rubber hydrochloride in the presence of a stabilizer is of advantage.

Likewise, the proportions and type of solvent used to dissolve the rubber hydrochloride-ester gum composition may vary. In general benzol and its homologues are most suitable. However, chlorinated solvents such as ethylene dichloride, carbon tetrachloride and tetrachlorethane may be used; also hydrogenated naphthas are of value, particularly when used in conjunction with other solvents. Acetone may be used as a diluent and to reduce the viscosity of the coating solutions.

The following examples will illustrate our invention:

Example I

Two formulae for a coating composition, particularly adapted for coating on flexible rubber surface are as follows:

|  | No. 1 | No. 2 |
|---|---|---|
| Amorphous rubber hydrochloride | 10 | 20 |
| Hydrogenated methyl abietate | 4 | 6 |
| Hydrogenated naphtha | 50 | 50 |
| Toluol | 50 | 50 |

Example II

Solutions of clear adhesives were prepared according to the following formulae:

|  | A | C |
|---|---|---|
| Milled, amorphous, stabilized rubber hydrochloride | 600 | 350 |
| Methyl abietate | 300 | 700 |
| Rosin | 150 |  |
| Acetone | 1050 | 765 |
| Benzol | 1050 | 765 |
| Total solids | 33.3% | 40.8% |
| Conc. RHCl in solvent | 18.6% | 18.6% |

The compositions can be used, if kept at room temperature or above without fear of gelation. They give a clear, strong adhesive. Formula C gives a clear, permanently tacky adhesive, suitable for masking tape and as a general purpose adhesive. Formula A gives a clear, hard setting adhesive. It is understood that the above formulae are merely illustrative. Hydrogenated ethyl abietate, ethyl abietate and hydrogenated methyl abietate may be used in place of methyl abietate.

*Example III*

A rapid drying, non-gelling, permanently tacky adhesive was prepared according to the following formula:

| | |
|---|---|
| Milled stabilized amorphous rubber hydrochloride | 100 |
| Hydrogenated methyl abietate | 200 |
| Acetone | 221 |
| Benzol | 221 |

The above composition is useful as a can sealer, masking tape, etc.

*Example IV*

A rapid drying, non-gelling adhesive, which hardens and does not remain tacky was prepared according to the following formula:

| | |
|---|---|
| Milled stabilized amorphous rubber hydrochloride | 200 |
| Hydrogenated methyl abietate | 100 |
| Rosin | 50 |
| Acetone | 350 |
| Benzol | 350 |

The above composition is useful as a general purpose adhesive, a household adhesive, waterproof glue for boots, waterproof gasket cements, etc.

We claim:

1. A fluid composition which on evaporation of its volatile liquid gives a permanently tacky adhesive, said composition consisting essentially of a dispersion in a volatile solvent of 1 part by weight of milled stabilized amorphous rubber hydrochloride and from 1 to 3 parts by weight of a fluid ester gum selected from the group consisting of alkyl and aralkyl esters of resin acids and monohydroxy alcohols.

2. A fluid composition which on evaporation of its volatile liquid gives a permanently tacky adhesive, said composition consisting essentially of a dispersion in a volatile solvent of 1 part by weight of milled stabilized amorphous rubber hydrochloride and approximately 2 parts by weight of methyl abietate.

HERBERT A. WINKELMANN.
JAMES P. McKENZIE.